United States Patent [19]

Barnik et al.

[11] Patent Number: 5,295,009
[45] Date of Patent: Mar. 15, 1994

[54] POLARIZER DEVICE

[75] Inventors: Mikhail I. Barnik; Seraey V. Belyaev, both of Dolgoprudny, Russian Federatio; Jürg Fünfschilling, Basel, Switzerland; Nikolai Malimonenko, Lobnya, Russian Federatio; Martin Schadt, Seltisberg, Switzerland; Klaus Schmitt, Lörrach, Fed. Rep. of Germany

[73] Assignees: Hoffmann-La Roche, Nutley, N.J.; Niopic Moscow Research and Production Association, Rissian Federatio

[21] Appl. No.: 59,037

[22] Filed: May 7, 1993

Related U.S. Application Data

[60] Division of Ser. No. 841,252, Feb. 24, 1992, Pat. No. 5,235,443, which is a continuation of Ser. No. 547,900, Jul. 3, 1990, abandoned.

[30] Foreign Application Priority Data

Jul. 10, 1989 [CH] Switzerland .......... 2562/89
Nov. 1, 1989 [CH] Switzerland .......... 3948/89
May 15, 1990 [CH] Switzerland .......... 1641/90

[51] Int. Cl.$^5$ .............................. G02F 1/13
[52] U.S. Cl. ........................ 359/65; 359/37; 359/48; 359/53; 359/101
[58] Field of Search ............... 359/37, 38, 48, 53, 359/65, 70, 101

[56] References Cited

U.S. PATENT DOCUMENTS

| | | | |
|---|---|---|---|
| 3,943,369 | 3/1976 | Saeva .................. | 250/568 |
| 4,073,571 | 2/1978 | Grinberg et al. ........ | 359/37 |
| 4,139,272 | 2/1979 | Laesser et al. ......... | 359/49 |
| 4,264,148 | 4/1981 | Gobl-Wunsch et al. ..... | 359/46 |
| 4,753,752 | 6/1988 | Raynes et al. .......... | 252/299.65 |
| 4,900,133 | 2/1990 | Berman ................. | 359/36 |
| 4,991,924 | 2/1991 | Shankar et al. ......... | 359/39 |
| 5,050,966 | 9/1991 | Berman ................. | 359/38 |
| 5,150,234 | 9/1992 | Takahashi et al. ....... | 359/65 |
| 5,200,844 | 4/1993 | Suvada ................. | 359/65 |

FOREIGN PATENT DOCUMENTS 302619 2/1989 European Pat. Off. .
87/05017 8/1987 PCT Int'l Appl. .

OTHER PUBLICATIONS

Belayev et al., Jap. J. of Appl. Phys. 29(4) L634–L637 (Apr. 1990).
Jacobs et al., J. Opt. Soc. Am., 5, 1962–1979 (1988).
Kimura et al., SID 88 Digest, 49–52 (1988).
Sato et al., IEEE Transactions on Electron Devices, 21, 312–313 (1974).
Schadt et al., SID 90 digest, 324–326 (1990).
Scheffer et al., Appl. Phys. Lett., 45, 1021–1023 (1984).
Schiekel et al., App. Phys. Lett., 19, 391–393 (1971).
Derwent E19 L03 U11.
Sato et al., IEEE Transactions on electron Devices, "Liquid-crystal color light valve", vol. ED 21, No. 2, pp. 171–172 (1974).

Primary Examiner—Donald Hajec
Assistant Examiner—Tan Ho
Attorney, Agent, or Firm—George M. Gould; George W. Johnston

[57] ABSTRACT

The polarizer comprises a layer of cholesteric liquid crystal with Grandjean structure disposed in the path of the light and in which the light in a given wavelength range is reflected with selective and circular polarization or is transmitted with reversed direction of rotation, and a mirror which reversed the direction of rotation of the circular-polarized light. The component reflected by the mirror is also transmitted. If the liquid crystal layer is concentric with the source of natural light and the mirror is spherical, the result is a source of circular polarized light. A projection system is obtained by a combination of two of the aforementioned polarizers, one serving as a polarizer and one as an analyzer, and an interposed liquid crystal display cell for modulating the intensity of the polarized light.

7 Claims, 7 Drawing Sheets

POLARIZER DEVICE

This is a division of application Ser. No. 07/841,252 filed Feb. 24, 1992, now U.S. Pat. No. 5,235,443, which is a continuation of Ser. No. 07/547,900, filed Jul. 3, 1990, now abandoned.

FIELD OF THE INVENTION

This invention relates to a polarizer.

BACKGROUND OF THE INVENTION

The term polarizer is used to mean an optical device which transmits polarized light or components of natural light in a given state of polarization, and blocks other components. In a narrower sense, therefore, a polarizer is a device for producing polarized light from natural light. "Natural light" means non-polarized light, i.e. white, colored monochromatic light. An "analyzer" is a polarizer used for analyzing the state of polarization of light.

The most widely-used polarizer is the sheet polarizer for producing linear-polarized light. These polarizers have the disadvantage that half the incident natural light is necessarily lost.

A polarizer which would deliver more than half of the incident light in the form of polarized light would be a considerable technical advance.

Unexpectedly, a polarizer has now been found which polarizes nearly all the incident natural light. It is based on frequency-selective reflection of cholesteric liquid crystals having a Grandjean structure in combination with a mirror used for reversing the direction of rotation of circular-polarized light.

BRIEF DESCRIPTION OF THE DRAWINGS

Embodiments and applications of the invention will now be described with reference to the accompanying drawings, in which:

FIG. 14 shows another reflective type color-projection system; an.

DETAILED DESCRIPTION OF PREFERRED EMBODIMENTS

Figure 1:
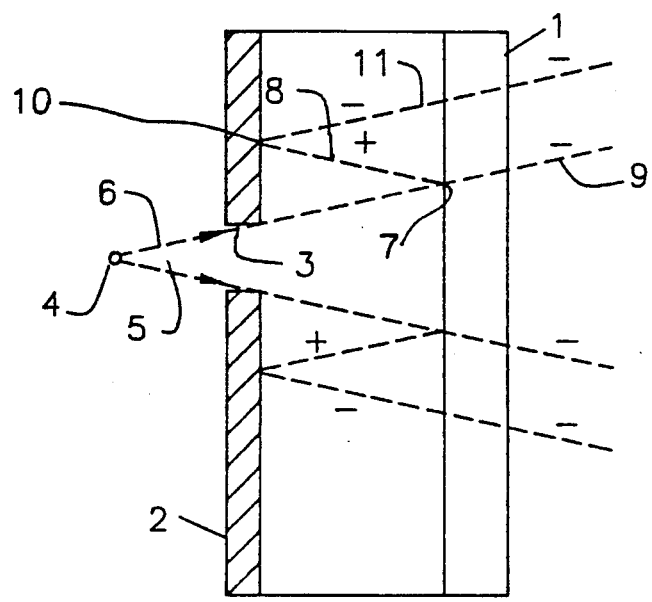
FIG. 1 is a diagram showing the basic operation of the invention.

FIG. 1 shows an embodiment of the invention, that is, a polarizer in a very simplified schematic representation illustrating its basic operation. The polarizer comprises a layer 1 of cholesteric liquid crystal. The liquid crystal is in the "Grandjean" structure, that is, a term known in the art used to describe molecules which are oriented in a substantially planar manner by suitable boundary conditions. The boundary conditions are produced in a manner known in the art by providing inner surfaces of the plates facing the liquid crystal with a PVA layer which is rubbed in one direction. For simplicity, the plates, which are known per se, are not shown in FIG. 1. The liquid crystal layer is flat.

Oriented cholesteric liquid crystal layers reflect in substantially only one wavelength region, in which the wavelength is about equal to the pitch of the cholesteric helix (the active wavelength region). The spectral width of the reflection region can be varied in a known manner by a suitable choice of the liquid crystal. The reflected light is completely circular-polarized. The direction of rotation in which the circular-polarized light is reflected depends on the direction of rotation of the cholesteric helix. Polarization rotating in the opposite direction in transmitted undimmed.

A conventional mirror 2 having an orifice plate 3 is disposed parallel to and at a distance from the liquid crystal layer. A beam 5 from a monochromatic light source 4 can enter the system through the orifice plate 3. The path of the beam and the changes in the state of the incident light will be explained hereinafter with reference to one of the boundary rays 6.

Ray 6 strikes the liquid crystal layer at point 7. At this point, circular-polarized light is reflected, that is light which is polarized in circular manner with rotation to the right or to the left (hereinafter called right-circular or left-circular for short), depending on the direction of rotation of the liquid crystal layer. In the drawings, the direction of rotation to the right is indicated by "+" and to the left is indicated by "−". Accordingly, let the reflected ray 8 be right-circular polarized, whereas light with the opposite direction of rotation is transmitted undimmed. Ray 9 is therefore left-circular polarized. Ray 8 reaches the reflector 2 where it is reflected at point 10. On reflection, as is known, the direction of rotation of polarization (hereinafter called the polarization direction for short) is reversed, so that the reflected ray 11 is now left-circular polarized and, as a result of this property, is transmitted undimmed by the liquid crystal layer 1, like ray 9. Rays 11 and 9 together account for practically the entire intensity of the incident beam 6, if its spectral width and position coincide with those of the cholesteric liquid crystal. The resulting polarization is practically loss-free. Of course, the polarization process applies not only to the boundary ray 6 but to the entire light beam 5. The entire emerging beam therefore has uniform circular polarization. Linear-polarized light, if required, can be obtained without difficulty. As is known, linear-polarized light can be produced from circular-polarized light without loss, by using a λ/4 plate. Accordingly a λ/4 plate (not shown) can be disposed behind the arrangement shown in FIG. 1, to obtain linear-polarized light.

If the cholesteric layer 1 is replaced by a number of cholesteric layers having different spectral selectivity, a polarizer of white light can be obtained. A multi-layer liquid crystal can advantageously be made from polymeric liquid crystals.

Figure 2:
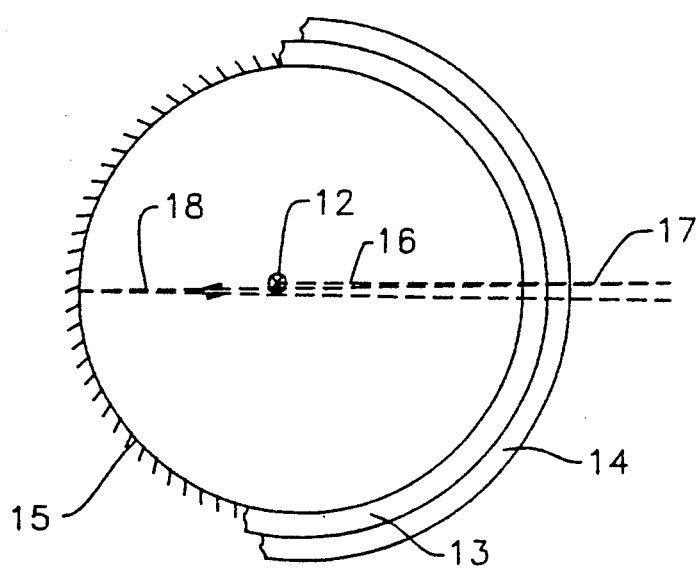
FIG. 2 shows a light source for producing polarized light.

FIG. 2 shows a light source for producing polarized light. A light source 12 for producing non-polarized light is disposed at the center of a spherical arrangement. The spherical arrangement comprises a cholesteric liquid crystal layer 13 on a spherical support (not shown) and having a first spectral selectivity, and a second liquid crystal layer having a second spectral selectivity. The spectral selectivity of the two liquid crystal layers is such that the resulting light is white. The other hemisphere of the support has a reflecting coating 15. Light 16 emitted by the light source arrives at the inner liquid crystal layer 13, where it is split up, depending on its polarization, and either transmitted or reflected. The transmitted beam 17 is therefore circular-polarized and has a spectral composition corresponding to the selectivity of the liquid crystal layer 13. An additional split occurs at the second liquid crystal layer 14, i.e. transmission for one polarization and reflection for the opposite polarization. If the liquid crystal layers are suitably chosen, a large part of the total spectrum can be split up in this form at the two layers, so that approximately while light is produced. Of course, a further improvement can be made by one or more additional liquid crystal layers. The reflected beams 18 arrive at and are reflected by the metal mirror 15 disposed on the other side of the liquid source 12. During reflection, the direction of polarization is reversed, so that the reflected light now has the same direction of rotation as the already-transmitted light. It can therefore travel undimmed through the liquid crystal layers 13 and 14.

Figure 3:
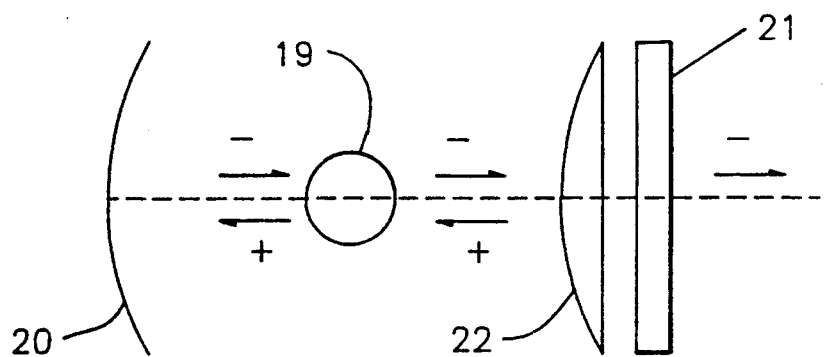
FIG. 3 shows an alternative form of a light source for producing polarized light.

FIG. 3 shows an alternative embodiment. A monochromatic light source 19 is disposed approximately in the middle of a spherical concave mirror 20. A cholesteric liquid crystal layer 21, not spherical but flat in the present case, is disposed on the opposite side. This makes it easier to orient the liquid crystal, since planar wall orientation on a flat surface is easier than on a spherical surface, although a flat liquid crystal layer causes greater aberration. A plant-convex lens 22 is disposed between the light source and the liquid crystal layer. In practice, the liquid crystal layer can be disposed directly on the flat side of the lens.

Operation of this embodiment is basically the same as previously described. The light source produces non-polarized light, which enters the liquid crystal layer 21 through lens 22, either directly or after being reflected at mirror 20. At layer 22, the left-circular polarized component, indicated by an arrow with a minus sign, is transmitted. The right-circular component, indicated by an arrow and a plus sign, is reflected and arrives at the mirror 20. On being reflected, this component undergoes a reversal of polarization to left-circular and can thus also pass through the liquid crystal layer 21. As before, practically all the light is uniformly polarized. In the case of a white light source, the non-affected spectral component is also transmitted. If this component also has to be polarized, additional liquid crystal layers with matched spectral selectivity have to be added.

Figure 4:
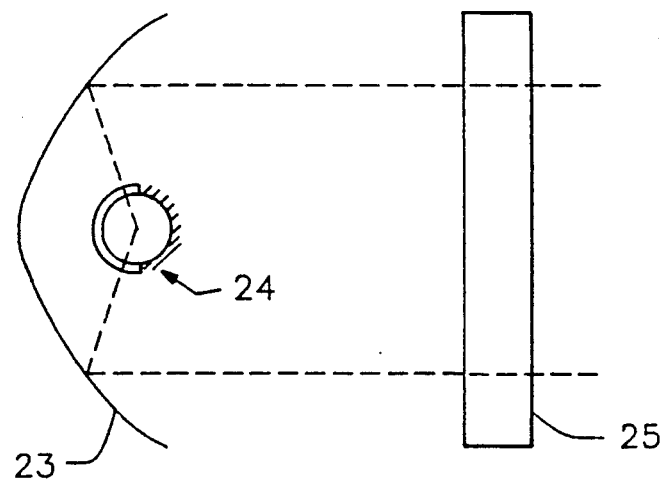
FIG. 4 shows a light source according to FIG. 2 applied to a headlight.

FIG. 4 diagrammatically shows advantageous use of an aforementioned light source in a headlight. The light source as in FIG. 2 is disposed in the focus of a parabolic mirror 23. Its liquid crystal layer 24 faces the mirror. It can comprise a number of layers having different spectral selectivity, for producing polarized white light. All the polarized light arrives at the parabolic mirror 23, where it is emitted in the form of a parallel beam in the direction of radiation, i.e. to the right in FIG. 4. The front plate 25 of the headlight is a λ/4 plate, which converts circular-polarized into linear-polarized light.

As a result of the light source according to the invention, with an almost 100% yield of polarized light, it is for the first time possible to construct an efficient motor headlamp which is dazzle-free as a result of polarization.

Figure 5:
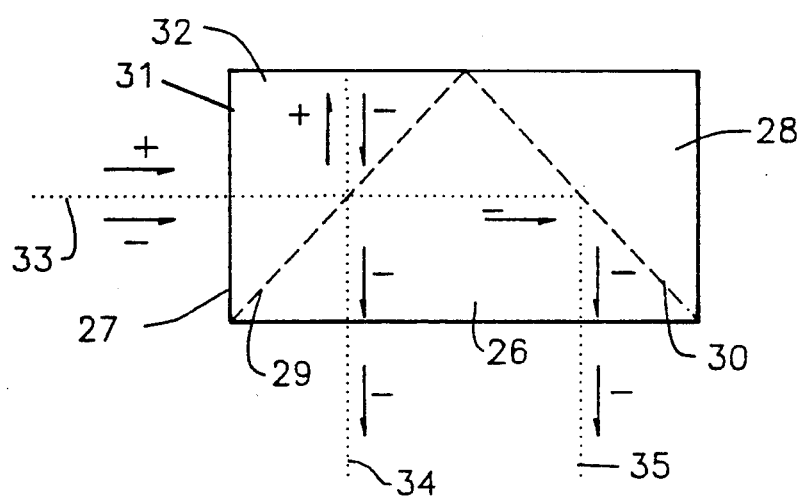
FIG. 5 shows a device for converting a non-polarized monochromatic light beam into polarized light.

FIG. 5 shows a polarizer for decoupling a circular-polarized wavelength band from a collimated white light beam or a laser beam. In the selected wavelength region, all the light in the incident beam is converted into polarized light. The rest of the light is transmitted undimmed and can be additionally processed by other similar polarizers with other selective wavelength regions.

The polarizer comprises three rectangular isosceles prisms 26, 27, 28. They are disposed so that layers 29, 30 of cholesteric liquid crystal are situated between them. The middle prism 26 is larger than the other two prisms 27, 28, i.e. the short surfaces of the middle prism 26 are equal to the hypotenuse surfaces of the other two prisms 27 and 28. The inlet prism 27 has a short surface 31 which is at right angles to the hypotenuse surface of the large prism 26 and through which the light enters. The other short surface 32 of the entry prism 27 is given a metal coating, i.e. a reflecting coating. As an alternative to being disposed between prisms, the liquid crystal layers can e.g. be suitably disposed plane layers in cells, or polymer coatings on plates, etc.

The incident collimated light beam 33 is non-polarized, i.e. its light can be regarded as left-circular superimposed on right-circular polarized light. This is indicated by arrows and "−" for left-circular and "+" for right-circular polarized light. The incident light 33 reaches the first liquid crystal layer 29, which is e.g. chosen so that it reflects right-circular polarized light. The reflected light reaches the mirror 32, where it is reflected and its direction of polarization is reversed. The light, now left-circular polarized, can travel unhindered through the first liquid crystal 29 and is in the form of a left-circular polarized beam 34 when it leaves the device. The left-circular polarized component of the incident light travels through the first liquid crystal layer 29 and reaches the second liquid crystal layer 30. The second liquid crystal layer 30 is chosen so that it has approximately the same spectral selectivity but the opposite direction of rotation from the first liquid crystal layer 29. As a result, the left-circular polarized light, now transmitted by the first liquid crystal layer 29, is reflected at the second liquid crystal layer 30, and is likewise in the form of a left-circular polarized beam 35 when it leaves polarizer, parallel to the first reflected beam 34 on the exit side.

The light 34, 35 leaving the bottom of the polarizer is uniformly left-polarized and comprises practically all the available light in the chosen spectral range. Light in the incident beam 33 outside the spectral range travels through the device without being dimmed and leaves it through prism 28 on the right of the drawing of FIG. 5.

Figure 6:
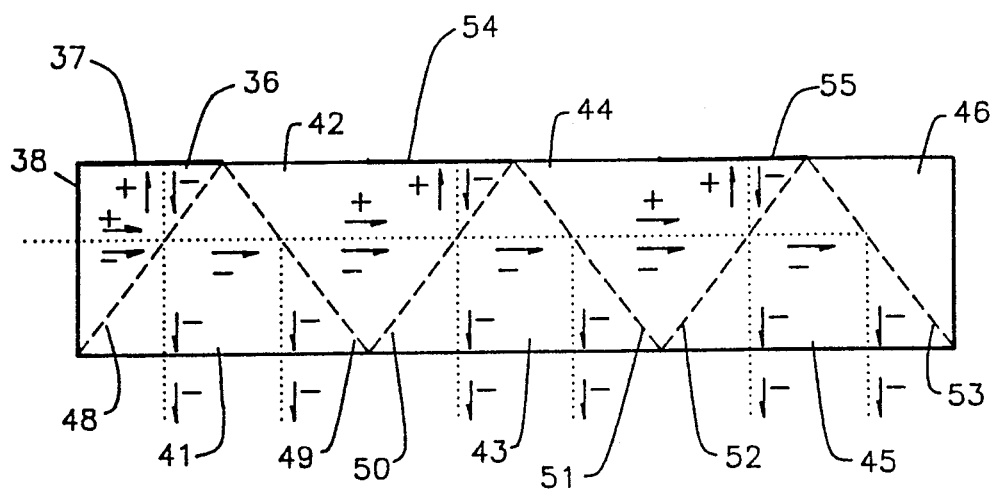
FIG. 6 shows a device for converting non-polarized white light into polarized white light.

As already mentioned, the non-polarized light leaving the polarizer and containing the spectral components not processed thereby can be supplied to other similar polarizers having different spectral selectivity. Instead of disposing a number of polarizers behind one another as in FIG. 5, an arrangement for producing polarized light in three spectral ranges can be constructed from seven prisms as shown in FIG. 6. Basically, this arrangement is a series circuit of three polarizers as in FIG. 5. It comprises five prisms 41-45 of equal size and having their short surfaces joined together and containing liquid crystal layers 49-52 between their respective surfaces in contact. A small prism 36 is disposed on the short surface of the first prism 41 remote from the second prism 42, and has a hypotenuse surface area equal to the short surfaces of the larger prisms 41-45. The short surface 37 of the small prism 36 parallel to the hypotenuse surfaces of the larger prisms has a reflecting coating. Its other short surface 36 is the entry side for light. The liquid crystal layer 48 is also disposed between the entry prism 36 and the first large prism 41.

A small rectangular isosceles prism 46 is also disposed on the exit side on the exposed short surface of the last large prism 45, and a liquid crystal layer 53 is disposed between the hypotenuse surface of prism 46 and the short surface of the large prism 45. The arrangement therefore comprises six liquid crystal layers 48-53. Each pair of liquid crystal layers have the same wavelength sensitivity and opposite polarization properties.

The top surfaces of the second and the fourth large prism, disposed in the same plane as the reflecting surface of the small entry prism 36, also have reflecting coatings 54 and 55.

In this arrangement as before, cholesteric layers between or on flat plates can be used instead of prisms.

The color sequence depends on the intended use. Since liquid crystal layers have better transmission for long-wave than for short-wave light, it is advantageous initially to decouple the short-wave light.

The incident while light is non-polarized and travels through the entry prism 36 to the first liquid crystal layer 48, which, for example, reflects right-polarized light in the blue spectral component and transmits the left-polarized component thereof. The other spectral components are also transmitted. The reflected light is reflected at mirror 38 and its direction of polarization is reversed in the process. The light, which is now left-polarized, can travel through the first liquid crystal layer 48 and leaves the device on the exit side, which is downward in FIG. 6. The transmitted left-polarized light is reflected at the second liquid crystal layer 49, which has the same wavelength range, and likewise leaves the device at the exit side. The two beams leaving the arrangement at the exit side have uniform left-circular polarization and constitute the entire blue component of the incident light. The remaining spectral component of the light travels to the third liquid crystal layer 50, where as before the right-circular polarized component of the green spectral range is reflected whereas the left-circular polarized component is transmitted. The reflected green light is again reflected at mirror 54 and its direction of polarization is reversed, so that the light has left-circular polarization and can leave the arrangement downwards. The transmitted green light is reflected at the liquid crystal layer 51 and likewise leaves the arrangement in the downward direction. The two beams have uniform left polarization and constitute the entire green component of the incident light. The remaining red component of the light reaches the last two liquid crystal layers 52, 53, where the same processes occur as before. At the end, all the light has been divided into three spectral regions and given uniform left polarization. If the three spectral regions are chosen so that they cover the entire visible spectrum, practically no light is wasted.

In the active wavelength region, a single cholesteric liquid crystal layer splits the light into a completely transmitted component which is circular-polarized in one direction and completely reflected component which is circular-polarized in the opposite direction. By analogy with the polarizer, therefore, the layer can also be used in transmission and in reflection as an analyzer for circular polarized light. In transmission, the only light influenced is in the active wavelength region, i.e. the wavelength region must be selected by another optical element. In reflection, only the active wavelength region is reflected, i.e. the layer also acts as a mirror sensitive to wavelength.

Figure 7:
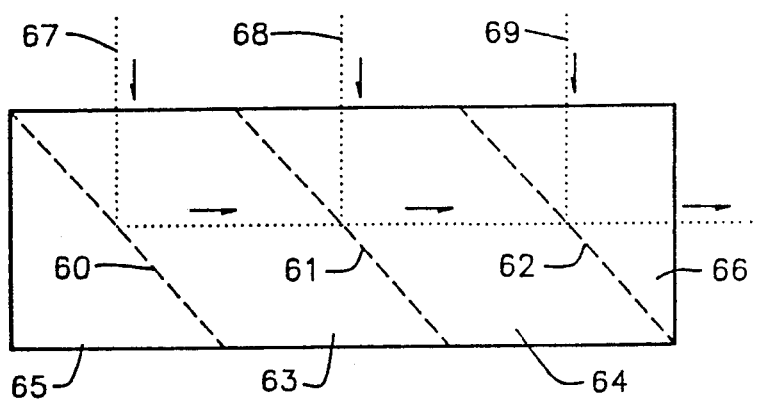
FIG. 7 shows a three-colored analyzer.

The property of selective reflection is also suitable for combining the functions of an analyzer, wavelength selector and beam combiner. A corresponding device is shown in FIG. 7. The analyzer substantially comprises three cholesteric liquid crystal layers 60-62 disposed parallel to one another and spaced apart at 45° to the direction of incident light. They have different wavelength selectivity and the same direction of rotation, e.g. they all three reflect right-circular polarized light only, or all three reflect left-circular polarized light only. The arrangement is made up of two prisms 63, 64 having a parallelogram cross-section, and two rectangular isosceles prisms 65, 66. Alternatively as before, liquid crystal cells can be disposed obliquely in a holder between glass plates (cell) or liquid crystal polymer layers.

Suppose the liquid crystal layer 60 reflects e.g. right circular polarized light in the blue spectral region. If the incident beam 67 corresponds to this spectral region and is right-circular polarized, it is completely reflected and, without being influenced, travels through the other two liquid crystal layers 61, 62 to the exit side of the analyzer. The same applies to beams 68 and 69 for the green and red spectral regions. If beams 67, 68 and 69 contain other color components or other polarization components, these components are not reflected but are transmitted through the liquid crystal layers. In the case of these components, therefore, the analyzer is completely transparent in the direction of incident light.

Figure 8:
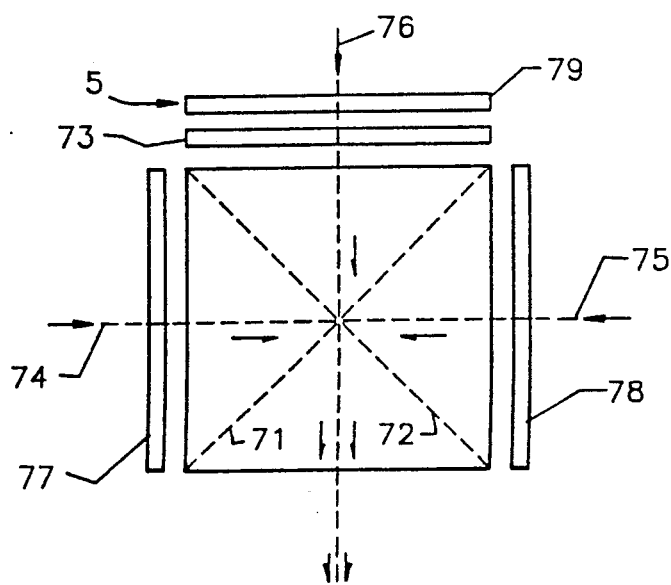
FIG. 8 shows an alternative form of a three-color analyzer.

Another form of a three-color analyzer is shown in FIG. 8. In this analyzer, two liquid crystal layers operate in reflection and a third in transmission. The two cholesteric liquid crystal layers 71, 72 operating in reflection are disposed between the adjacent small surfaces of four prisms combined into a cube. In this case the beams for the three primary colors do not arrive parallel to one another but from three different directions. The beam 74 for blue comes from the left in the drawing and is reflected at the liquid crystal layer 72. The beam 75 for the red region comes from the right in the drawing and is reflected at the liquid crystal layer 71. The green color comes from above in the drawing and is transmitted by the liquid crystal layer 73. If therefore all three colors are uniformly polarized, the liquid crystal layer 73 needs to have the opposite direction of rotation from the liquid crystal layers 71 and 72. Also, false spectral components must previously be eliminated from the green beam 76, since otherwise they could mingle with the outgoing light. This does not apply to the blue and red colors, since false spectral components are not reflected at the respective liquid crystal layers.

Liquid crystal cells are disposed in the path of the three light beams 74–76 and modulate them. The modulation process will be described hereinafter in the case of projection systems.

Projection systems using liquid crystals are known. They comprise a light source, a polarizer device, a liquid crystal display cell, an analyzer device and a projection lens system. In the case of color projection, use can also be made of color filters which filter e.g. the three primary colors from the light from the source. Depending on the electro-optical effect used in the liquid crystal cells, the analyzer may also be omitted (e.g. in the quest-host effect). Usually the light is split into three separate beams, each containing a liquid crystal display cell for modulating the light. The three beams are then superposed on the projection screen in three projection lens systems, or are first combined and projected by a single lens.

The liquid crystal display cell can be of any well-tried kinds, e.g. rotary cells (TN), high-twist cells (STN, SBE), DHF cells, SSFLC cells, guest-hose cells, DAP cells, ECB cells etc. All these cells are usually operated with linear polarized light. Most cells product a phase shift, depending on voltage, between the two directions of polarization set by linear polarizers.

The previously-described polarizers and analyzers are particularly suitable for these projection systems. If the light has to be linear-polarized, the circular polarized light can be converted into linear polarized light by using a $\lambda/4$ plate, before it reaches the liquid crystal display. In that case a second $\lambda/4$ plate must be inserted behind the liquid crystal display and in front of the analyzer, in order to recover the circular polarized light. The construction however is simpler if circular polarized light can be used directly, since this avoids the two additional $\lambda/4$ plates.

Owing to the excellent light yield from the projection systems described here, they are superior to all known projection systems. This can advantageously be applied to large-area projection of liquid crystal displays, e.g. for video and TV projection.

In the case of some of the aforementioned liquid crystal display cells, the cell parameters have to be modified during operation with circular polarized light, i.e. if the direction of polarization is rotated (mode guidance by the helix). This component of the electro-optical effect is not used in the case of circular polarized light, but it influences the position of the polarizers and the optimum ratio of double refraction to cell thickness.

If, in the case of the double-refracting component, the phase shift between the two modes propagated in the liquid crystal is $(n+\frac{1}{2})$ times the wavelength $(n=0, 1...)$, circular polarized light alters the direction of rotation. If the analyzer is sensitive to direction of rotation (e.g. selective reflection) a switch-over from light to dark can be made exactly as in the case of linear polarizers. When working with circular polarized light, therefore, use can be made of any liquid crystal display cell whose operation is based on the fact that the applied voltage produces a difference in pitch of $(n+\frac{1}{2})\cdot\lambda$ between suitably defined directions of polarization. The novel methods of operating liquid crystal cells will be discussed in detail at the end of this description, with reference to FIGS. 14–17.

Figure 9:
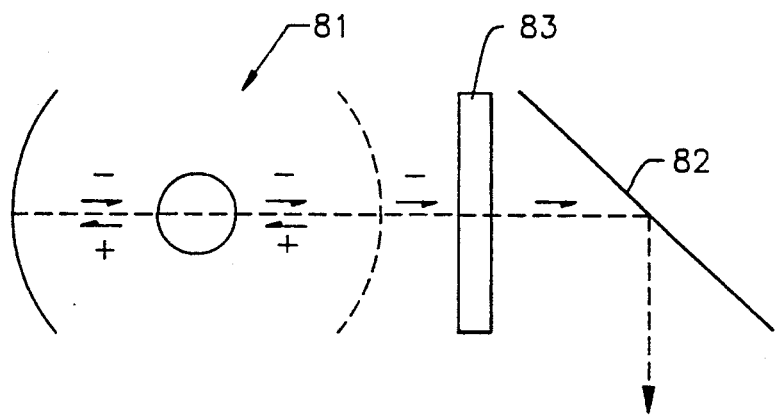
FIG. 9 shows a monochromatic projection system.

FIG. 9 shows a monochromatic projection system comprising a light source 81 for circular polarized light as per FIG. 2 and serving as an analyzer 82 and wavelength selector of a single cholesteric liquid crystal layer. A liquid crystal display cell 83 for modulating the light is disposed between the polarizer 81 and analyzer 82. The cholesteric layers in the polarizer and the analyzer can both be multi-layer, i.e. comprise a number of cholesteric layers with different active wavelength regions, in order to reproduce the color white.

Figure 10:
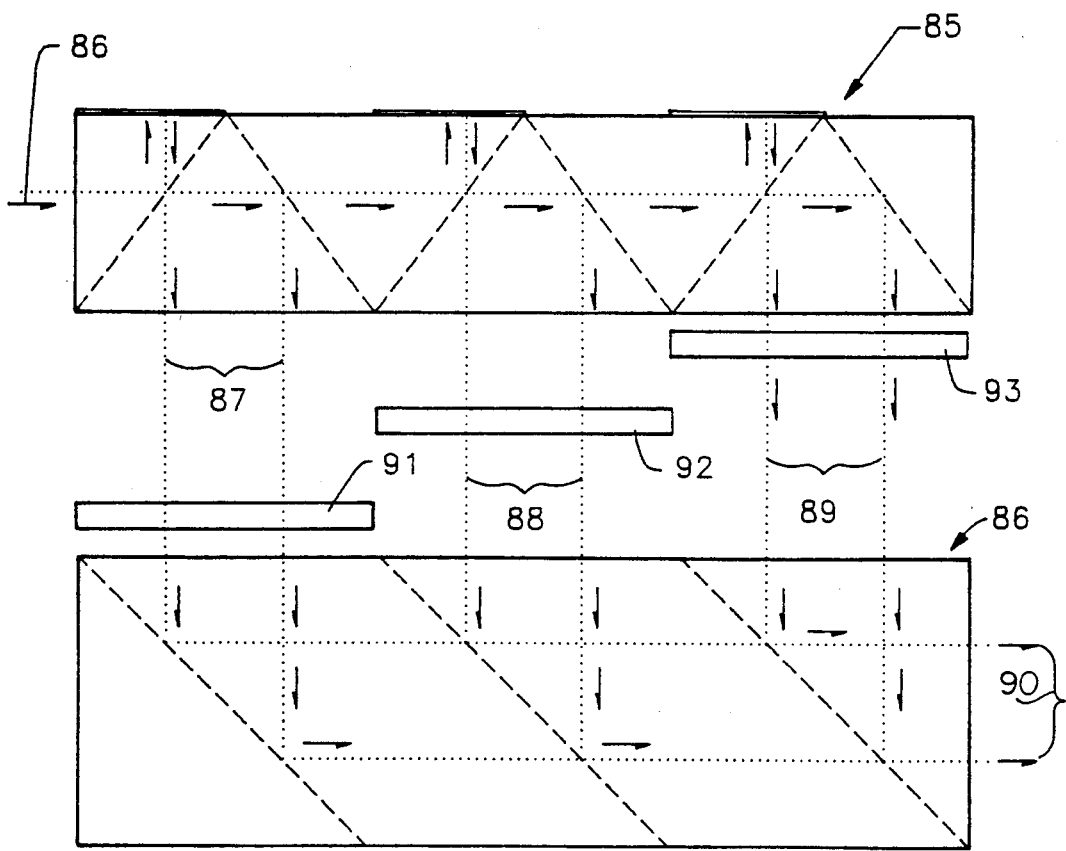
FIG. 10 shows an application of the invention to a color projection system.

These and similar projection systems comprising other polarizer/analyzer combinations can be made triple for the three primary colors or more than triple, i.e. for multi-color projection systems. A single lamp may be sufficient. The advantages of a triple or multiple projection optical system include simple color matching by mechanical or electro-optical orifice plates (e.g. rotary cells) in the projection system. FIG. 10 shows a color projection system comprising a polarizer 85 as in FIG. 6 and an analyzer 86 as in FIG. 7. A white non-polarized incident light beam 86 is divided into three circular-polarized beams 87, 88, 89 in different spectral ranges, as per the previous description of the polarizer in FIG. 6. Liquid crystal display cells 91–93 for modulating each color are disposed in the path of the three beams. The three liquid crystal display to the projection lens is the same for all three. After traveling through and, if required, being modulated by the liquid crystal cells 91–93, the three light beams are recombined into a single beam 90 in the analyzer, as described in conjunction with FIG. 7.

Figure 11:
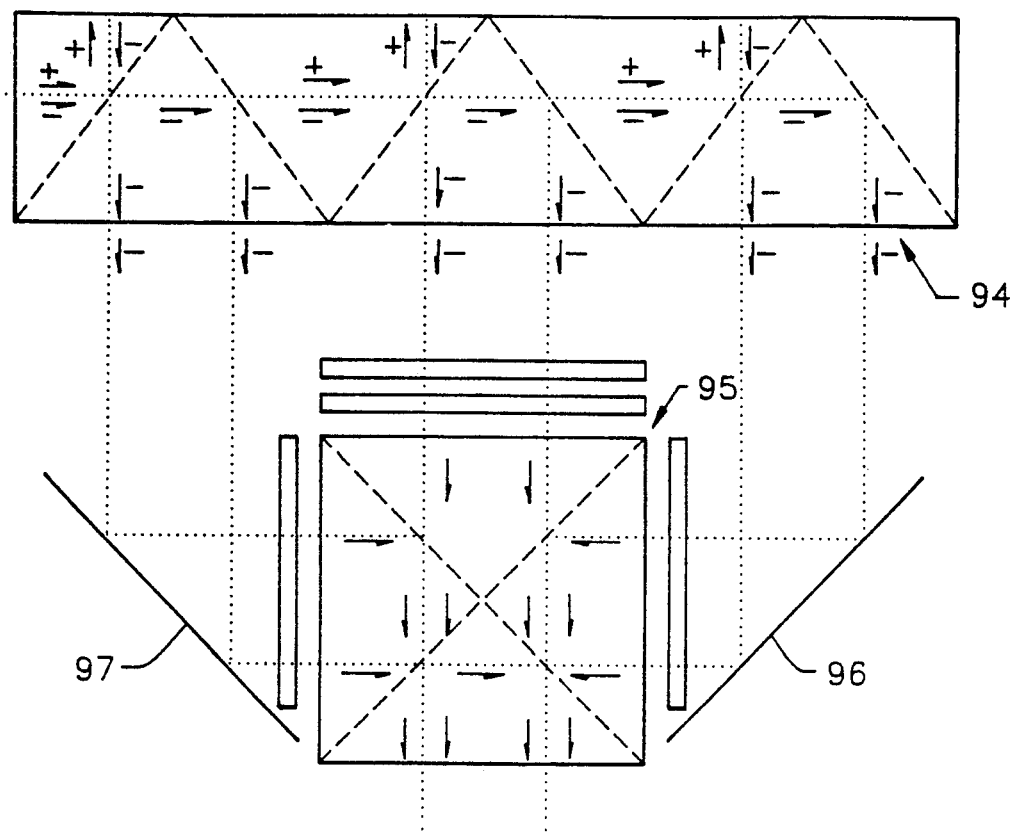
FIG. 11 shows an alternative form of a color-projection system.

FIG. 11 shows a polarizer 94 as in FIG. 6 combined with an analyzer 95 as in FIG. 8. Conventional surface mirrors 96 and 97 are used for guiding the beam.

Figure 12:
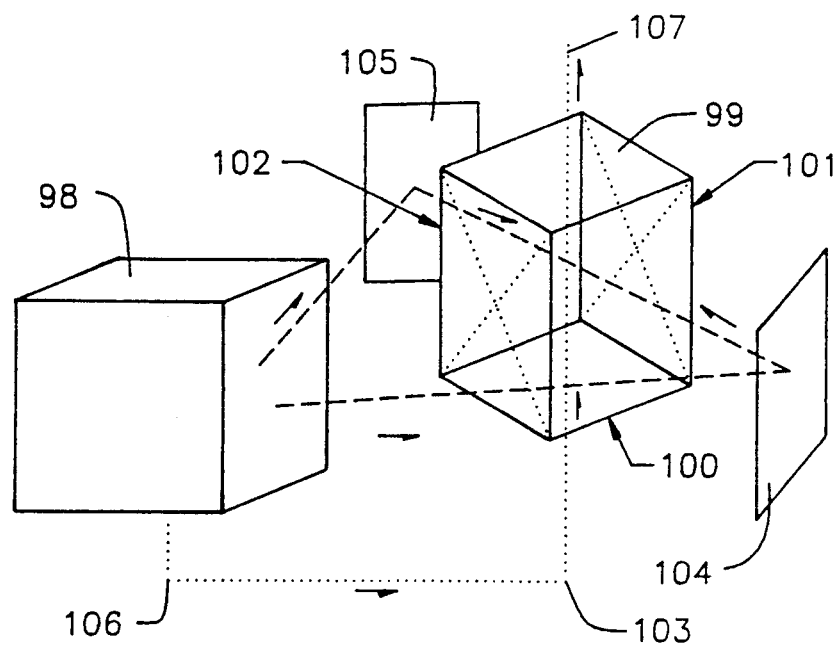
FIG. 12 shows another alternative form of a color-projection system.

Finally FIG. 12 shows a light source 98 as in FIG. 2 combined with an analyzer 99 as in FIG. 8. The lamp is disposed on the body diagonal of a cube 38 so that two opposite sides of the tube can be used for positioning the cholesteric layers or the mirrors opposite them. In this manner one light source gives three beams, which are circular-polarized in the respective active wavelength region. The analyzer is the same as in FIG. 8 and the liquid crystal display cells are disposed on surfaces 100–102. A tilted mirror 103 is constructed as a color-selective liquid crystal mirror. Mirrors 104, 106 are normal surface mirrors. The three colors are recombined in the exit beam 107.

All the projection systems hitherto have been transmissive systems. However, the proposed polarizers and analyzers are also suitable for reflective systems. Reflective projection systems are particularly advantageous for "TFT" applications, since no light is lost in a non-transparent transistor.

Figure 13:
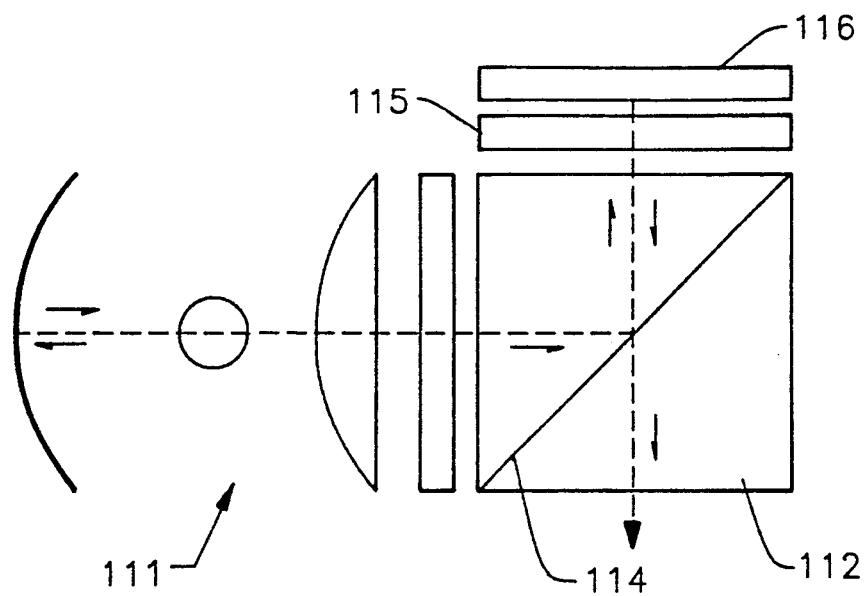
FIG. 13 shows a reflective type color-projection system.
Figure 14:
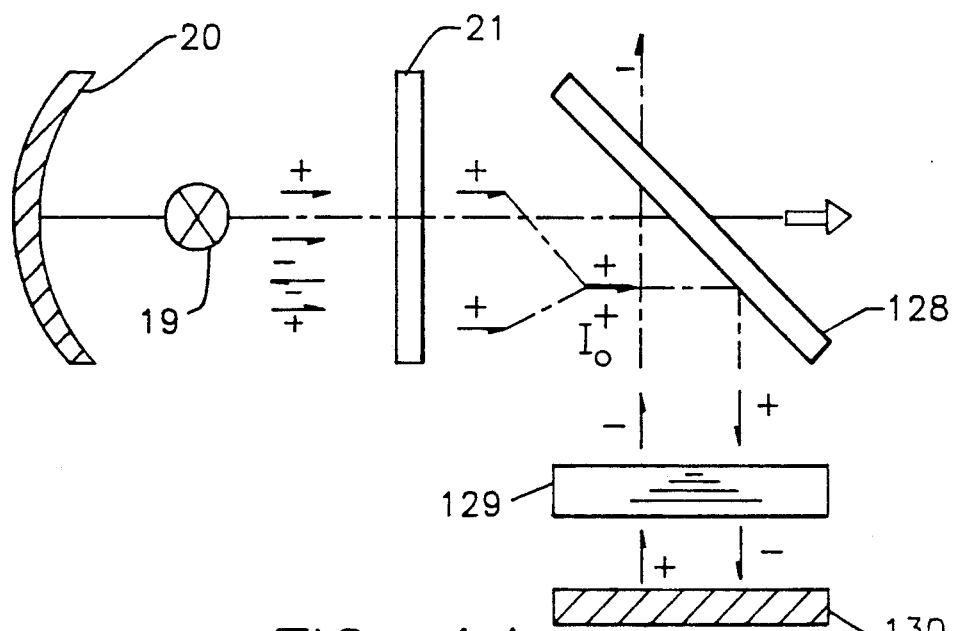

FIG. 13 shows an example of an aforementioned projection system. Light coming from a light source 111 as in FIG. 3 is divided at an additional cholesteric layer 114 in a beam-dividing tube 112 and only the correct color with the correct circular polarization is reflected whereas the rest of the light is transmitted.

The light then travels through a liquid crystal display cell 115 and is reflected at mirror 116, travels again through cell 115 and strikes the beam divider 114, which analyzes its circular polarization and now transmits the reflected light, because its direction of polarization has been reversed at mirror 116. The transmitted light can be projected or first combined with different-colored light from corresponding other polarizers. In a liquid crystal (e.g. TFT, MIM, etc.) equipped with integrated active electronic elements, the electrodes actuated by the transistor of each pixel are constructed as mirrors. The set of these electrodes constitutes the mirror 116.

Since the light travels twice through the liquid crystal display cell 115, it also undergoes a double phase shift, i.e. to obtain the same electro-optical effect the double refraction must be only half as great as in a transmissive display of equal thickness. The arrangement can be made even more compact if the lens and tube are used as boundary surfaces for the cholesteric liquid crystal and if the display cell also directly used the tube as a boundary surface.

All possible combinations of polarizers and analyzers can be constructed on the basis of the monochromatic system, in the same manner as with transmissive systems.

The reflection-type projection system shown in FIG. 4 contains again a light source 19, mirror 20 and the cholesteric liquid crystal layer 21 which converts the light into the right-circular mode, similar to the embodiments described before. The light arriving from this light source encounters a cholesteric liquid crystal layer 128 of opposite circularic arranged under an angle of 45° in the light path. This second cholesteric filter deflects the beam portion, which has the selective bandwidth of the filter as a right-circular beam, by 90° to a combination of a liquid crystal cell 129 and a mirror 130. The cell 129 contains a minimum optical path difference between on and off state of λ/2 or an odd number multiple thereof. This cell thus changes the circularity of the circularly polarized light into the left-circular mode, whereby the circularity is changed again on reflection at mirror 130. The right-circular light reflected from mirror 130 is changes again into the left circular mode by cell 129 and can uninhibitedly pass the layer 128.

The light outside the band width of the cholesteric layer 128 is not deflected and leaves the system to the right.

The cholesteric layers can be made e.g. from cholesteric materials having a helical pitch of about $p<1.5$ $\mu$m and an optical anisotropy of about $n>0.09$. The cholesteric materials can be cholesteric liquid crystals or glass phases having a latent cholesteric structure. Suitable materials with a sufficiently wide temperature range at normal operating temperatures are known to the skilled artisan.

The material for producing the cholesteric layers can advantageously be a liquid-crystal side-chain polymer with a chiral side chain which has a cholesteric liquid crystal phase or a glass phase with cholesteric structure and also has a helical pitch of about $p<1.5$ $\mu$m and an optical anisotropy of about $n>0.09$. Polymers of this kind are known and commercially available in some cases. Examples of suitable substances are the following polysiloxanes with a cholesteric side chain, obtainable from the Konsortium für elecktrochem. Industrie, Munich, under the following type designations:

| Type designation | Maximum selective reflection |
| --- | --- |
| W 2648 | 0.658 $\mu$m |
| W 2649 | 0.540 $\mu$m |
| C 4754 | 0.540 $\mu$m |
| C 4768 | 0.678 $\mu$m |
| C 4760 | 0.600 $\mu$m |
| C 4745 | 0.460 $\mu$m |

These polymers have a glass transition temperature of about 50° C. and a clarification temperature of about 180° C. The width of the reflection bands is about 60 nm.

The material for producing the cholesteric layers can also preferably be a cholesteric liquid crystal mixture having an optical anistropy $\Delta n>0.09$ and comprising a nematic base material and one or more chiral dopants in a quantity inducing a twist with the required helical pitch $p<1.5$ $\mu$m in the nematic matrix. The nematic base material should have a sufficiently wide nematic mesophase and can preferably comprise two or more components. A large number of suitable components and mixtures are known. They have mainly been described in connection with liquid crystal display devices, and many of them are commercially available. A list of these materials with literature references is contained e.g. in D. Demus et al, Flüssige Grundstoffindustrie, Leipzig, Volume 1 (1976) and Volume 2 (1984). The desired optical anisotropy $n>0.09$ can easily be obtained by choosing components in which at least about half the rings are aromatic, or mixtures where the proportion of these components is sufficiently high.

Suitable chiral dopants are also known to the skilled artisan such as, for example, U.S. Pat. No. 4,753,752, WO 87/05017 and EPA 89.106808.2, corresponding to U.S. patent application Ser. No. 07/343,477. The proportion of chiral dopants in the cholesteric mixture will depend on the required helical pitch and can easily be determined in individual cases. If desired, any dependence of the helical pitch on temperature can be compensated by the methods described in U.S. Pat. No. 4,264,148 (corresponding to DE A 2827471) and EP-A-0 304 738 corresponding to U.S. Ser. No. 07/234,222. In addition it may be advantageous to compensate the temperature dependence of the refraction indexes as well.

Preferred chiral dopants are optically active compounds having formula:

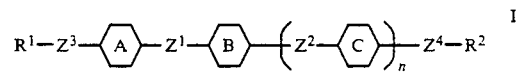

in which n stands for the number 0 or 1; the rings A, B and C independently denote 1,4-phenylene, either non-substituted or substituted by halogen, cyano, methyl and/or methoxy, and in which 1 or 2 CH groups are replaced by nitrogen if required, or one of the rings A, B and C also denotes trans-1,4-cyclohexylene; $Z^1$ and $Z^2$ independently denote a single covalent bond, —CH$_2$CH$_2$—, OCH$_2$, —CH$_2$O, —COO— or —OOC—; $Z^3$ and $Z^4$ independently denote a single covalent bond, oxygen, —COO— or —OOC; $R^1$ and $R^2$ independently denote the radical of an optically active terpene alcohol after splitting off the hydroxy group or a chiral group —C*HX$^1$—R$^3$, —CH$_2$—C*HX$^1$—R$^3$, —C*H(CH$_3$)—COOR$^3$, —C*H-R$^4$—COOR$^3$, —C*H(CH$_3$)—CH$_2$OR$^3$, —C*H(CH$_3$)—CH$_2$COOR$^3$, or —C*H(CH$_3$)—, CH$_2$CH$_2$OR$^3$; C* denotes a chiral carbon atom, X$^1$ denotes fluorine, chlorine, cyano, methyl, hydroxy, methoxy or methoxycarbonyl, R$^3$ denotes alkyl or alkenyl and R$^4$ denotes phenyl, and optically active compounds having the formula

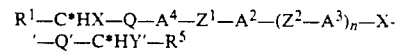

II wherein $R^1$ is alkyl or perfluoroalkyl with 1–12 carbon atoms or an alkyl or perfluoroalkyl group with 1–12 carbon atoms in which one or two non-adjacent $CH_2$ or $CF_2$ groups are replaced by at least one of —O—, —CO—, —COO—, —CH=CH—, —CHhalogen—, —CHCN—, —O—CO—CHhalogen— or —O—CO—CHCN—; $R^5$ is different from Y' and signifies alkyl with 1–15 carbon atoms or an alkyl group with 1–15 carbon atoms in which one or two non-adjacent $CH_2$ groups are replaced by at least one of —O—, —CO—, —O—CO—, —CO—O— or —CH=CH—; $A^2$, $A^3$ and $A^4$ each independently are unsubstituted 1,4-phenylene or 1,4-phenylene substituted with at least one of F, Cl, $CH_3$ or CN or having one or two CH groups replaced by N, trans-1,4-cyclohexylene or trans-1,4-cyclohexylene in which one or two non-adjacent $CH_2$ groups are replaced by at least one of —O— or —S—, piperidin-1,4-diyl, bicyclo[2.2.2]octane-1,4-diyl, naphthalene-2,6-diyl, decalin-2,6-diyl or tetralin-2,6-diyl; $Z^1$ and $Z^2$ each independently are —CO—O—, —O—CO—, —$CH_2CH_2$—, —$OCH_2$—, —$CH_2O$—, —C≡C— or a single covalent bond; X is halogen, cyano or methyl; n is 0 or 1; Q is alkylene with 1–4 carbon atoms, a single covalent bond or alkylene with 1–4 carbon atoms in which one $CH_2$ group is replaced with —O—, —CO—, —O—CO—, —CO—O—, —CH=CH—COO—, —CH=CH—, —CHhalogen— or —CHCN—; X' is —CO—O—, —O—CO—, —O—CO—O—, —CO—, —O—, —S—, —CH=CH—, —CH=CH—COO— or a single covalent bond; Q' is alkylene with 1–5 carbon atoms, a single covalent bond or alkylene with 1–5 carbon atoms in which a $CH_2$ group not linked with X' is replaced by —O—, —CO—, —O—CO—, —CO—O— or —CH=CH—; and Y' is cyano, halogen, methyl or methoxy.

In the preceding formulas I and II, $Z^1$ and $Z^2$ preferably each denote a single covalent bond. Preferably the rings A, $A^2$, $A^3$, $A^4$, B' and C are all aromatic, more particularly 1,4-phenylene, $Z^3$ preferably stands for —OOC— and $Z^4$ preferably stands for —COO—.

A preferred group of chiral dopants are those optically active compounds of formula I in which n stands for the number 1; the rings A, B and C independently denote 1,4-phenylene, either non-substituted or substituted by halogen, cyano, methyl and/or methoxy, and in which 1 or 2 CH groups are replaced by nitrogen if required; $Z^1$ and $Z^2$ each denote a single covalent bond; $Z^3$ denotes —OOC— and $Z^4$ denotes —COO—; $R^1$ and $R^2$ independently denote the radical of an optically active terpene alcohol after splitting off the hydroxy group or a chiral group —CH*$X^1$—$R^3$ or —$CH_2$—C*H$X^1R^3$; C* denotes a chiral carbon atom, $X^1$ denotes fluorine, chlorine, cyano, methyl or methoxy, and $R^3$ denotes alkyl or alkenyl.

The term "1,4-phenylene, non-substituted or substituted by halogen, cyano, methyl and/or methoxy, in which 1 or 2 CH groups are replaced by hydrogen if required" according to the invention includes groups such as 1,4-phenylene, fluoro-1,4-phenylene, chloro-1,4-phenylene, cyano-1,4-phenylene, 2,3-dicyano-1,4-phenylene, methyl-1,4-phenylene, methoxy-,4-phenylene, pyridine-2,5-diyl, pyrimidine-2,5-diyl, pyrazine-2,5-diyl, pyrimidine-2,5-diyl, pyrazine-2,5-diyl, pyridazine-3,6-diyl and the like.

The expression "halogen" comprises fluorine, chlorine, bromine and iodine, preferably fluorine and chlorine.

The expression "radical of an optically active terpene alcohol after splitting off the hydroxy group" denotes the T group of an optically active terpene alcohol having the formula TOH. The expression "terpene alcohol" is well known to the skilled artisan, e.g. from Rompps Chemie Lexikon, Volume 6, (1977) and denotes alcohols derived from monoterpenes. The expression "monoterpene" includes terpene hydrocarbon $C_{10}H_{16}$ and its hydrogenation and dehydrogenation derivatives. The following are examples of preferred optically active terpene alcohols: (1R,2S,5R)-(−)-menthol, (1S,2R,5R)-(+)-isomenthol, (1S,2S,3S,5R)-(+)-isopinocampheol, (1S)-(−)-borneol, (1R)-(−)-myrtenol, (1S,2S,5R)-(+)-neomenthol, (−)-carveol, (+)-dihydrocarveol, (+)-terpene-4-ol (+)-α-terpineol and the like.

The expressions "alkyl" and "alkenyl" comprise straight-chain and branched radicals preferably with not more than 15 carbon atoms, such as methyl, ethyl, propyl, isopropyl, butyl, isobutyl, pentyl, hexyl, heptyl, octyl, nonyl, vinyl, 1-propenyl, 1-butenyl, 1-pentenyl, allyl, 2-butenyl, 2-pentenyl, 3-butenyl, 3-pentenyl, 4-pentenyl, 5-hexenyl, 6-heptenyl and the like. Manufacture of chiral dopants is described in the aforementioned citations or can be brought about by similar methods.

The following are examples of preferred cholesteric mixtures. The helical pitch p was measured at 22° C. In the following list C denotes a crystalline phase, $S_C^*$ denotes a chiral smectic C phase, $S_A$ denotes a smectic A, Ch denotes a cholesteric phase and I denotes the isotropic phase.

Figure 15:
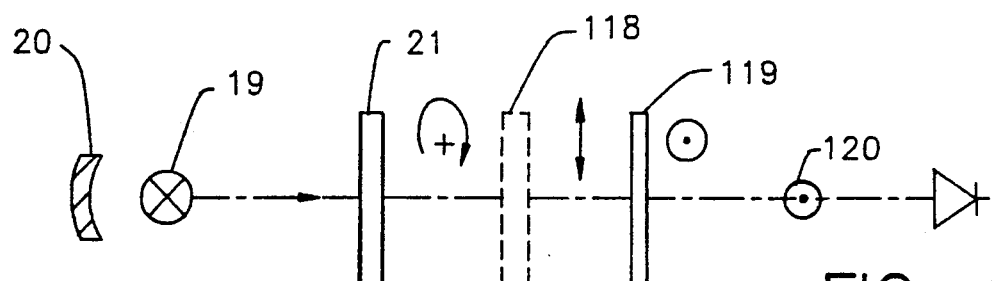
FIGS. 15-19 show various methods of operating liquid crystal cells comprising the novel polarizers.

As already mentioned, FIGS. 15–19 show various methods of operating liquid crystal cells with various polarizers. FIG. 15 shows an arrangement containing a light course similar to those shown in FIG. 3, the lens being omitted for simplicity. Light emitted by a monochromatic source 19 at e.g. λ=600 nm is converted into circular light rotating to the right in a cholesteric liquid crystal layer 21 as described in connection with FIG. 3, either directly or after being reflected at mirror 20. A λ/4 plate 118 is disposed behind the liquid crystal layer 21 and converts the circular polarized light into linear polarized light. The direction of polarization is indicated by a double arrow. A TN cell 119 is disposed behind the λ/4 plate 118 and in known manner rotates the direction of polarization of the light through 90°. The rotated light can pass undimmed through a linear polarizer behind the TN cell 119 and rotate it through an angle of 90° relative to the direction of polarization before the cell, provided no voltage is applied to the cells. If a voltage is applied to cell 119, the rotary effect is stopped and the light, which is no longer rotated, cannot pass through the polarizer 120. The TN cell 119 therefore operated in the conventional manner, in which the direction of polarization of the incident light is rotated in the switched-off state (wave-guiding mode).

Figure 16:
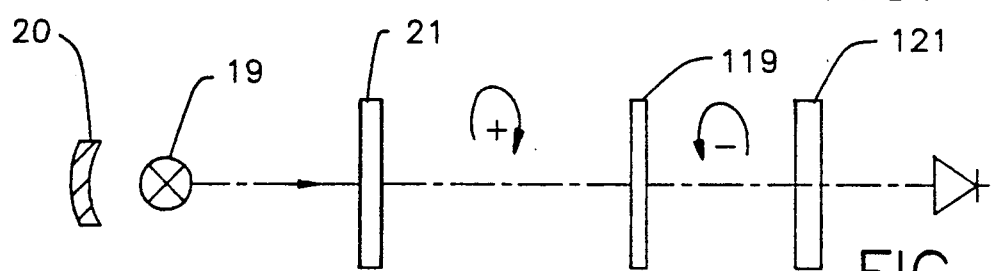

Another method of operation is shown in FIG. 16. Circular polarized light rotating to the right and produced as previously described is supplied directly to a TN cell 119. In this method of operation the cell must have a minimum optical pitch difference of $\delta = \Delta n \cdot d = \lambda/2$ between the switched-off and the switched-on state. If this condition if fulfilled, the circular polarized light alters its direction of rotation in transit, i.e. from right (+) to left (−) in the present case. An additional cholesteric layer 121 is disposed behind the TN cell 119 and is permeable to the first layer 21 in the opposite direction of rotation from before, i.e. to the left. If the TN cell 119 is switched on and consequently becomes optically uniaxial, it does not influence the state of polarization of the light, which is therefore not blocked by the cholesteric liquid crystal layer 121.

Figure 17:
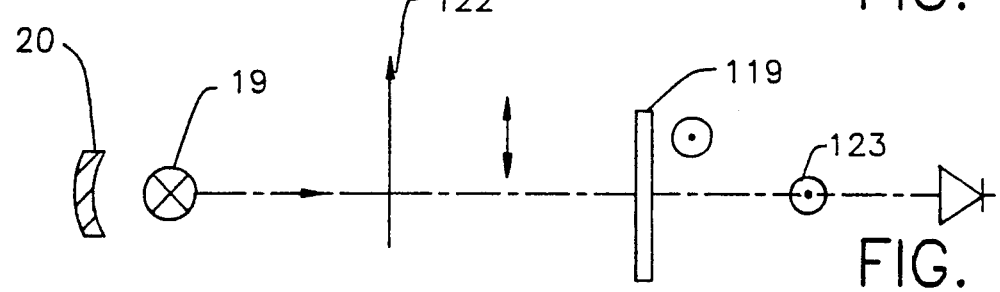

At the exit, the two arrangements in FIGS. 15 and 16 deliver the full intensity radiated by the light source 19, because there are no polarizers absorbing part of the light. By comparison, FIG. 17 shows the conventional arrangement comprising a TN cell 119 equipped with linear polarizers 122 and 123. Since the entry polarizer 122 absorbs half the total light, at most 50% of the original intensity can come out at the exit side.

The arrangements in FIGS. 15-17 deliver a positive contrast if display cells are constructed on this principle. A negative contrast can be obtained in each case without difficulty, i.e. by using a cholesteric layer rotating to the right instead of to the lift in FIG. 16, or in known manner in the other two cases by rotating the linear polarizers through 90° on the exit side.

Figure 18:
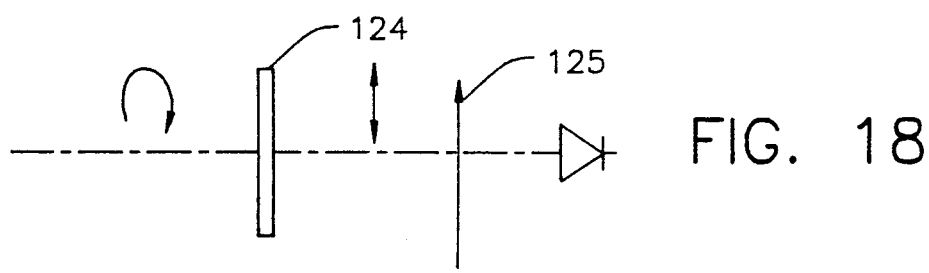

FIG. 18 shows an arrangement likewise based on the fact that, as in FIG. 16, circular polarized light is directly supplied to a TN cell 124. In contrast to FIG. 16, however, the TN cell 124 has a minimum optical pitch difference of $\delta = \lambda/4$ between the switched-off and the switched-on state. In the switched-off state, therefore, it acts as a $\lambda/4$ plate, which converts circular polarized light into linear polarized light. A linear polarizer 125 disposed behind the TN cell can block the linear polarized light in a suitable position. In the switched-on state, the TN cell does not influence the circular polarized light, which is therefore transmitted by the linear polarizer 125.

Instead of a TN cell, any other liquid crystal cell can be used for this arrangement, provided the condition $\delta = \lambda/4$ or an integral multiple thereof is possible. If circular polarized light is available, e.g. from the light sources in FIGS. 15 and 17, the arrangement in FIG. 18 can give a 100% output of light. If however non-polarized white light is used in conventional manner, the known loss of 50% occurs when circular polarized light is produced by a linear polarizer and an $\lambda/4$ plate. Even so, the extra expense of the additional $\lambda/4$ plate compared with the known manner of operation in FIG. 17 can pay off, because the characteristic voltages for a TN cell are much lower, e.g. up to 50%, than the voltages in the conventional manner of operation.

Figure 19:
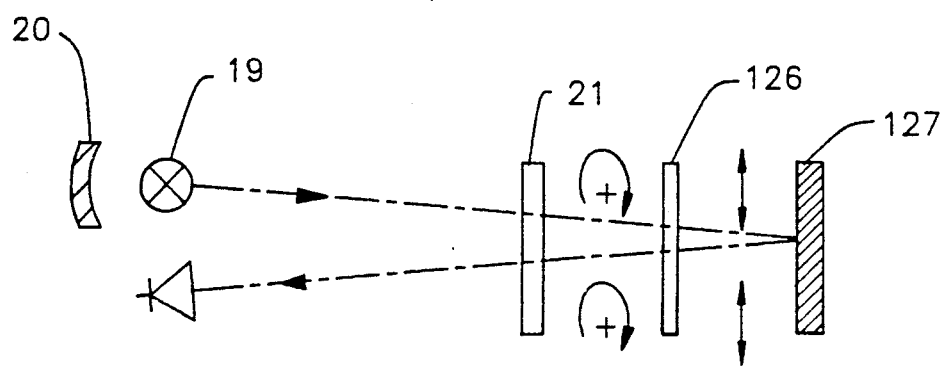

FIG. 19 shows a device operating with reflection. This corresponds to the previously-described alternative comprising a TN cell with $\delta = \lambda/4$ plate between the switched-off and the switched-on plate. In this example, a DAP cell 126 is used. In the switched-off state, therefore, the cell acts as a $\lambda/4$ plate, i.e. the circular polarized light is converted into linear polarized light. After reflection at a mirror 127 the reverse process occurs, i.e. the linear polarized light is reconverted to circular polarized light in the ($\lambda/4$) cell, travels through the cholesteric layer 21 without hindrance and is available at full intensity at the exit. If a voltage is applied to cell 126, so that it becomes optically uniaxial, it does not influence the polarization state of the light. Consequently, right-circular polarized light behind the cell reaches the reflector 127, and on being reflected changes its direction of motion as already mentioned. The light, which is left-circular after reflection, travels uninfluenced by the DAP call 126 to the cholesteric layer 21, where it is blocked.

An advantage of this configuration is that the reflector 121 can be disposed on the substrate of the liquid crystal cell, so that light-absorbing structures such as thin-film transistors are disposed behind the reflector and thus do not reduce the aperture or brightness of the active surface of the picture element. Comparative tests have shown that the arrangements in FIGS. 15, 16 and 18 do in fact deliver about twice the brightness of the arrangement in FIG. 17. There is also, as mentioned, a marked reduction in the required control voltages.

With both operating modes of the liquid crystal cell, i.e. the one with linearly polarized as well as the one with circularly polarized light, it is possible to achieve flat as well as steep transmission characteristics. Accordingly, both flat curves with many fray shades for television applications as well as steep curves and thus highly multiplexible cells such as e.g. steep so-called super-twist cell are suitable.

If the angle of light incidence is more than 35%, unpolarized residual light may occur at the liquid crystal display cells in projection systems like the one shown in FIG. 10. In order to avoid a reduction of the contrast the unpolarized residual light may be suppressed by polarizers arranged in series to the liquid crystal display cells. The portion of unpolarized residual light is very small so that the additional polarizers cause only an insignificant weakening of the projection efficiency.

The series arrangement of several cholesteric liquid crystal layers of different spectral selectivity which was mentioned before in this specification may not only be used to approximate white light but also just to enlarge the band width of a cholesteric filter within one color region. By appropriate combination of cholesteric liquid crystal filters of different average wavelength the band widths of the selective reflection may be varies in a simple manner.

In addition to the already mentioned temperature compensation of the helix pitch of the applied cholesteric mixtures it is advantageous to compensate the temperature dependence of the refractive indexes as well.

The reflective type projection system shown in FIG. 14 comprises again a light source 19, a mirror 20 and a cholesteric liquid crystal layer to convert the light into right-handed circularly polarized light similar to the previously described embodiments. The light arriving from there impinges on a cholesteric liquid crystal layer 128 of opposite sense of rotation, which is arranged under a 45° angle in the light path. This second cholesteric filter deflects the light portion in its selective band width as right-handed circular beam under a right angle to a combination of a liquid crystal cell 129 and a mirror 130. The cell 129 exhibits a minimum optical path difference between On- and Off-states of $\lambda/2$ or an uneven multiple thereof as already described in connection with the embodiment of FIG. 15. This cell thus changes the sense of rotation of the circular-polarized light into left-handed type, whose sense of rotation is again reversed upon reflexion at mirror 130. The right-handed light reflected from mirror 130 is again converted into left-handed type by cell 129 and can unimpededly pass the layer 128. The light outside of the band width of the cholesteric layer 128 is not deflected and leaves the arrangement to the right.

We claim:
1. A projection system comprising:
 a) polarizer means for producing circular polarized light from natural light comprising i) light source means for producing a light path of natural light;

ii) liquid crystal means having a layer of cholesteric liquid crystal with a Grandjean structure and a cholesteric helix pitch with a defined value, the liquid crystal means being disposed in the light path of the natural light so that a portion of the light path having a wavelength which is about equal to the defined value of the cholesteric helix pitch is transmitted through the liquid crystal means and another portion of the light path having a wavelength which is about opposite in value to the defined value of the cholesteric helix pitch is rotated and reflected by the liquid-crystal means as circular polarized light, and iii) mirror means disposed in a path of the circular polarized light for reversing a direction of rotation of the circular polarized light so that the polarized light with a reversed direction is transmitted through the liquid crystal means.

b) analyzer means having a liquid crystal layer with cholesteric liquid having a defined value of a cholesteric helix pitch so that the layer transmits or reflects the portions of the light path of the natural light; and c) liquid crystal display cell means disposed between the polarizer means and the analyzer means for modulating intensity of the polarized light which is transmitted through the liquid crystal means.

2. A projection system according to claim 1, wherein the liquid crystal display cell means comprises a rotary cell (TN-LCD) or a rotary cell having angles of twist greater than or less than 90°.

3. A projection system according to claim 1, wherein the liquid crystal display cell means comprises a Surface Stabilized Ferroelectric Liquid Crystal cell.

4. A projection system according to claim 1, wherein the liquid crystal display cell means comprises a Helix Ferroelectric cell.

5. A projection system according to claim 1, wherein the liquid crystal display cell means comprises a Deformation of corrected phases cell.

6. A projection system according to claim 1, wherein the cholesteric liquid crystal means of the polarizer means and the analyzer means each independently comprise a number of cholesteric liquid crystal layers which are successively disposed in a direction away from the light source means, each layer having a defined value of a cholesteric helix pitch so that each layer either transmits or reflects the portions of the light path of the natural light.

7. A projection system according to claim 1 further comprising a λ/4 plate disposed behind a surface of the liquid crystal means facing away from the light source means; a liquid crystal display cell having an electro-optical effect; and polarizer means for making visible the electro-optical effect.

* * * * *

UNITED STATES PATENT AND TRADEMARK OFFICE
CERTIFICATE OF CORRECTION

PATENT NO. : 5,295,009
DATED : March 15, 1994
INVENTOR(S) : Mikhail I. Barnik et al.

It is certified that error appears in the above-identified patent and that said Letters Patent is hereby corrected as shown below:

In the Title Page, [75], Inventors: the second named inventor should read

-- Sergey V. Belyaev --.

Signed and Sealed this

Sixteenth Day of August, 1994

*Attest:*

BRUCE LEHMAN

*Attesting Officer*      *Commissioner of Patents and Trademarks*